(12) United States Patent
Iversen

(10) Patent No.: US 9,600,954 B2
(45) Date of Patent: Mar. 21, 2017

(54) DYNAMIC APPLICATION NAME DISPLAY

(75) Inventor: Shaun Iversen, Manly (AU)

(73) Assignee: GEMALTO SA, Meudon (FR)

( * ) Notice: Subject to any disclaimer, the term of this patent is extended or adjusted under 35 U.S.C. 154(b) by 122 days.

(21) Appl. No.: 13/508,230

(22) PCT Filed: Nov. 5, 2010

(86) PCT No.: PCT/EP2010/066934
§ 371 (c)(1),
(2), (4) Date: Sep. 12, 2012

(87) PCT Pub. No.: WO2011/054935
PCT Pub. Date: May 12, 2011

(65) Prior Publication Data
US 2012/0323942 A1 Dec. 20, 2012

(30) Foreign Application Priority Data
Nov. 5, 2009 (EP) .................................. 09306058

(51) Int. Cl.
G06F 17/30 (2006.01)
G07F 7/10 (2006.01)
G06Q 20/34 (2012.01)
G06Q 20/36 (2012.01)
G06F 15/16 (2006.01)

(52) U.S. Cl.
CPC ......... *G07F 7/1008* (2013.01); *G06Q 20/341* (2013.01); *G06Q 20/357* (2013.01); *G06Q 20/3552* (2013.01); *G06Q 20/3572* (2013.01); *G06Q 20/3574* (2013.01); *G06Q 20/363* (2013.01)

(58) Field of Classification Search
None
See application file for complete search history.

(56) References Cited

U.S. PATENT DOCUMENTS

| | | | |
|---|---|---|---|
| 7,445,149 B2 * | 11/2008 | Bonalle et al. | 235/380 |
| 7,494,058 B2 * | 2/2009 | Bonalle et al. | 235/380 |
| 8,417,561 B2 * | 4/2013 | Ghosh et al. | 705/7.34 |
| 8,504,451 B2 * | 8/2013 | Faith et al. | 705/35 |
| 8,571,972 B2 * | 10/2013 | Talbert et al. | 705/38 |

(Continued)

FOREIGN PATENT DOCUMENTS

| | | |
|---|---|---|
| EP | 0717381 A1 | 6/1996 |
| WO | WO0069183 A2 | 11/2000 |

(Continued)

OTHER PUBLICATIONS

ISO: "7816 part 4: Interindustry command for interchange", International Standard ISO/IEC, XX,XX, vol. 7816, No. 4, Sep. 1, 1995, pp. 37-73, XP002169265.

(Continued)

*Primary Examiner* — Alex Gofman
(74) *Attorney, Agent, or Firm* — The Jansson Firm; Pehr B. Jansson

(57) ABSTRACT

The present invention relates to a method for providing data during an Application Selection process from a processing device to an interface device, wherein it comprises a step of modifying dynamically at least a part of said data from transaction to transaction, said at least part of data being a dynamic data.

8 Claims, 3 Drawing Sheets

(56) References Cited

U.S. PATENT DOCUMENTS

| | | |
|---|---|---|
| 2002/0139861 A1* | 10/2002 | Matsumoto et al. ......... 235/492 |
| 2008/0059379 A1* | 3/2008 | Ramaci ................ G06Q 20/105 |
| | | 705/66 |
| 2008/0154770 A1* | 6/2008 | Rutherford et al. ............ 705/44 |
| 2009/0020603 A1 | 1/2009 | Foesser |
| 2009/0103730 A1* | 4/2009 | Ward et al. ................... 380/258 |
| 2010/0051689 A1* | 3/2010 | Diamond ...................... 235/380 |
| 2010/0159905 A1 | 6/2010 | Picquenot et al. |

FOREIGN PATENT DOCUMENTS

| | | |
|---|---|---|
| WO | WO2009018255 A2 | 2/2009 |
| WO | WO2009055704 A2 | 4/2009 |

OTHER PUBLICATIONS

PCT/EP2010/066934, Written Opinion of the International Searching Authority, Dec. 8, 2010, European Patent Office, P.B. 5818 Patentlaan 2 NL—2280 HV Rijswijk.
ISO/IEC 7816 part 4: Interindustry command for interchange, XP-002169265 Sep. 1, 1995, pp. 1-73.
PCT/EP2010/066934, International Search Report, Dec. 8, 2010, European Patent Office, P.B. 5818 Patentlaan 2 NL—2280 HV Rijswijk.

* cited by examiner

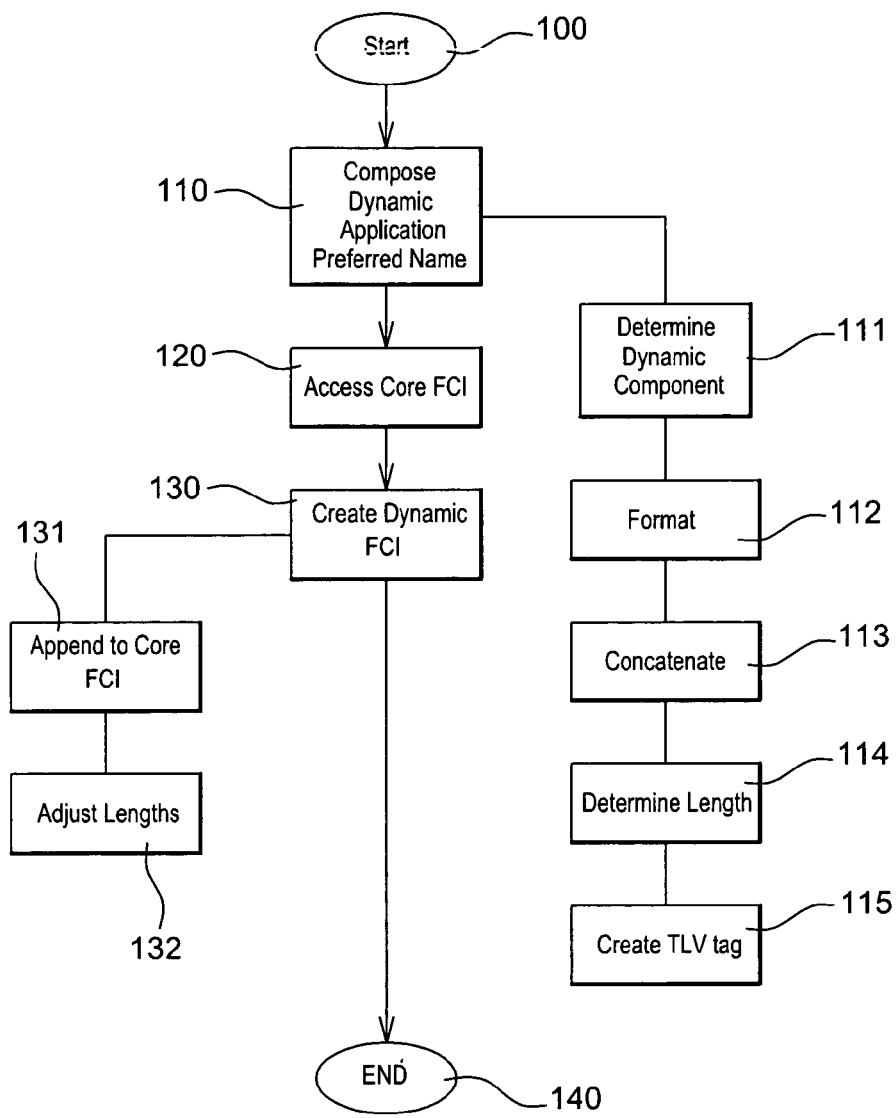

DYNAMIC APPLICATION NAME DISPLAY

BACKGROUND

1. Field of the Invention

The invention relates to the field of EMV payment applications.

The invention especially deals with a method for providing data during an Application Selection process

2. Description of the Related Art

EMV®(a registered trademark of EMVco) is a well known standard for the interoperation of Integrated Circuit Cards (ICC), also referred to as chip cards or smart cards, with payment terminals, also referred to as interface devices (IFD), used to initiate financial transactions. The EMV standard defines the interaction at the physical, electrical, data and application levels between secure devices such as for example smart cards and processing devices that process these secure devices, mainly a POS or an ATM fitted with a smart card reader for financial transactions. Portions of the standard are heavily based on the smart card interface standard defined in ISO 7816.

During the EMV process of an Application Selection, cardholders may choose which EMV Payment Application present on the integrated circuit card is to be selected to initiate and process the transaction. To help in the selection, the payment terminal may display a mnemonic that allows the cardholder to identify the application to be used for the transaction. The descriptive mnemonic displayed is provided to the terminal by the EMV Payment Application.

Each EMV Payment Application present on an ICC contains a file called File Control Information (FCI). During the EMV process of Application Selection, the FCI for each EMV Payment Application present on the smartcard, and mutually supported by the terminal, is transferred from the ICC to the terminal. Each FCI includes an optional Application Preferred Name and a mandatory Application Label associated with each EMV payment application. To allow the cardholder to choose which EMV Payment Application present on the integrated circuit card should be selected to initiate and process the transaction, the terminal displays the Application Preferred Name, if present, or the Application Label.

The mnemonic displayed, whether it is the Application Preferred Name or the Application Label, typically provides a description of the functionality associated with the underlying EMV Payment Application. Typical examples include: "Credit", "Debit" or "Savings". This mnemonic is static, which means that its value remains constant once the EMV payment application has been loaded to the ICC. It remains static throughout the life of the application.

Data involved in an EMV transaction is encapsulated and transported within data objects referred to as tags. For example, Tag '50' is the Application Label and Tag '9F12' is the Application Preferred Name.

The EMV standard defines tag values, the maximum lengths of the tag values, format and context. For example, tag value '9F12' which corresponds to the Application Preferred Name, as the mnemonic associated with an EMV payment application, is displayed by the terminal during the Application Selection. The maximum length of tag '9F12' is given by EMV standard as 16 bytes.

EMV standard does not allow to alter the value of tags that are located within the File Control Information (FCI). For this reason, the value of the Application Preferred Name is said to be static over the lifecycle of the application.

There is a need to provide a method that allows the mnemonic displayed to the cardholder during the process of Application Selection to vary over the course of the card's lifecycle.

SUMMARY OF THE INVENTION

It is an objective of the invention to provide a way to communicate information, of varying composition and length, to the cardholder during the EMV process of Application Selection.

According to one aspect of the invention, it is provided a method for providing data during an Application Selection process from a processing device to an interface device, wherein it comprises a step of modifying dynamically at least a part of said data from transaction to transaction, said at least part of data being a dynamic data.

Thanks to this method, the mnemonic displayed to the cardholder during EMV Application Selection, may be changed throughout the lifecycle of the EMV application.

According to other aspects of the invention:
the method may comprise, if said data contains static data, concatenating said static data and said dynamic data;
the method may comprise determining the value and the length of said dynamic data;
the method may comprise formatting said dynamic data;
the method may comprise creating a tag-length-value (TLV) format from the formatted dynamic data;
the data may be an Application Preferred Name;
the method may comprise using a remote host as processing device.
the method may comprise using an integrated circuit card as processing device;
the dynamic data may be incorporated into a File Control Information of the integrated circuit card, creating a dynamic File Control Information of variable length;
the method may comprise returning the dynamic file control information in response to a command received by the processing device from the interface device;

Thanks to this method the data incorporated into the mnemonic may reflect a changing or dynamic value that could represent a monetary or points balance, or a text string.

This changing data can be managed online, i.e., at a remote host, or offline, i.e., on the card. The communicated information is dynamic, i.e. it may change from transaction to transaction.

This method advantageously provides a way by which issuers can communicate varying information to the cardholder at the time of EMV application selection.

It is a further object of the invention to provide an interface device adapted to exchange data with a processing device adapted to process the method according one of the preceding claims.

The invention will now be described, by way of example, with reference to the accompanying drawings.

In order that the manner in which the above recited and other advantages and features of the invention are obtained, a more particular description of the invention briefly described above will be rendered by reference.

BRIEF DESCRIPTION OF THE DRAWINGS

Notwithstanding any other forms that may fall within the scope of the present invention, preferred embodiments of the invention will now be described, by way of example only, with reference to the accompanying drawings in which:

FIG. 2 schematically shows a flow diagram of a method according to the present invention.

FIG. 3 schematically shows an example of an FCI Record.

DETAILED DESCRIPTION

The present invention may be understood according to the detailed description provided herein.

A method according to the present invention provides a way to communicate information, of varying composition and length, to the cardholder during the EMV process of Application Selection.

In the following description, "n" will refer to a length in a core FCI, while an "L" will refer to a length in a dynamic FCI. The presence of an apostrophe (') symbol in variable names indicates that the length is constant over the life of the application; the value of a variable assigned an apostrophe (') symbol may vary from card to card, but not once the application has been personalized, that is, once the application has been loaded to the ICC, the length remains constant. Finally the use of single quotations signs throughout this specification indicates hexadecimal notation (HEX).

Figure 1:
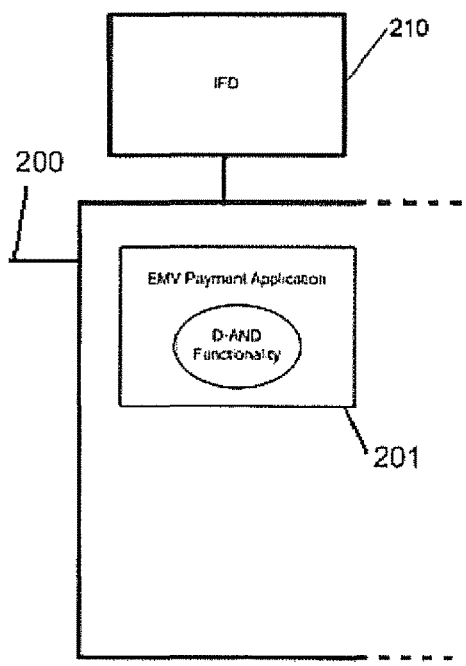
FIG. 1, 1a, 1b, 1c schematically show architectures of an ICC according to different embodiments.

FIG. 1 shows a method according to a first embodiment of the present invention where the information to be communicated to a cardholder during the EMV process of Application Selection is an account balance.

An ICC 200, suitable to communicate with a terminal 210, contains at least an EMV payment application 201.

The terminal 210 at the point of service is for example a card acceptor device equipped with a chip card reader. The terminal 210 interacts with the ICC 200 according to the client-server model. In accordance to EMV standards, commands (C-APDU) as specified in ISO 7816-4, are sent from terminal 210 to the ICC 200. Responses (R-APDU) to these commands are then sent from the ICC 200 to the terminal 210. In this embodiment, the method is processed by the EMV payment application 201 itself. In this case, the EMV Payment Application is said to incorporate a functionality associated with a Dynamic Application Name Display (D-AND). This functionality is carried out within the EMV Payment Application 201 in addition to all other functionalities required for the proper processing of a transaction in accordance with EMV standards.

Figure 1A:
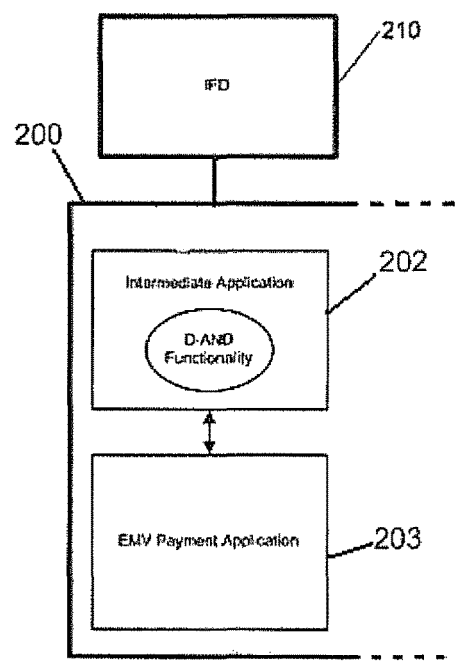
Figure 1B:
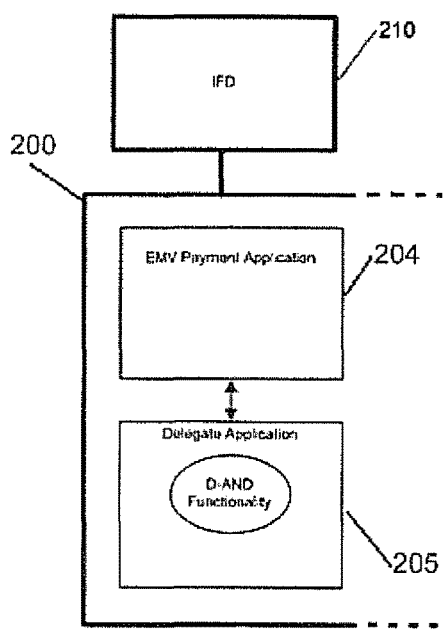
Figure 1C:
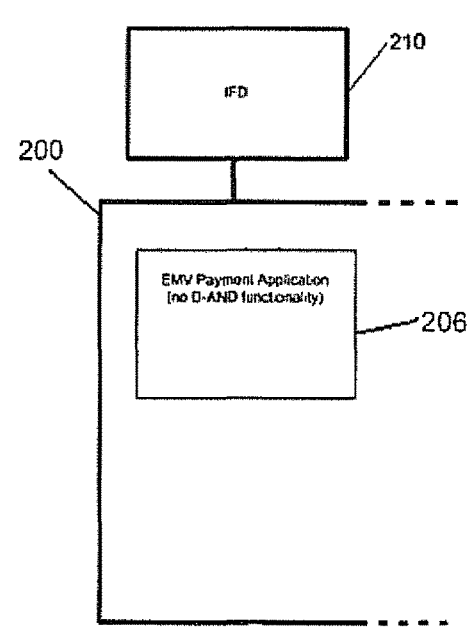

Some variants of the architecture on which the method can be processed are shown in FIGS. 1a, 1b, 1c.

As represented in FIG. 1a, the functionality associated with D-AND can for example reside within an application that exists outside the EMV payment application. An Intermediate Application 202 encompasses all functionalities associated with D-AND and is localised so that it acts as an intermediary between the terminal 210 and the EMV Payment Application 203. The Intermediate application 202, acting as an intermediary, receives all commands (C-APDUS) sent from the terminal 210 and either processes the command if the C-APDU requires D-AND functionality, or sends the C-APDU to the EMV Payment Application 203. In a similar way, the Intermediate Application 202 receives all responses (R-APDUS) sent from the EMV Payment Application 203 and either processes the response if the R-APDU necessitates D-AND functionality, or sends the R-APDU to the terminal 210. For example the Intermediate Application 202 can be a MULTOS Shell application which interfaces with the EMV payment application.

Alternatively as shown in FIG. 1b, the functionality associated with D-AND can reside within an application that is interfaced with an EMV Payment Application when functionality associated with D-AND is needed. In this embodiment, the EMV Payment Application 204 comprises the logic and data necessary to properly process a transaction in accordance to EMV standards. When the functionality associated with D-AND is needed, the EMV Payment Application 204 accesses a Delegate Application 205 via commands understood by Delegate Application 205. The Delegate Application 205 can perform the desired functionality associated with D-AND and provide a response that is understood by EMV Payment Application 204. Such commands and responses exchanged between the EMV Payment Application 204 and the Delegate Application 205 need not necessarily comply with the format of EMV-defined C-APDUs or R-APDUS.

According to another alternative, the ICC can also contain classic EMV payment applications 206 that do not use D-AND functionality and do not interfaced with applications that process such functionality as shown in FIG. 1c.

As described in all three embodiments above, each EMV Payment Application present on the ICC 200 contains an FCI which is to be transferred from the ICC 200 to the terminal 210. Each FCI includes the optional Application Preferred Name and the mandatory Application Label associated with each EMV payment application.

The EMV payment application using D-AND functionality is personalized with an FCI, the contents and lengths of which are entirely known. This original FCI record is referred to as the core FCI. All values comprising the core FCI, including lengths, are known and remain constant over the life of the application. The core FCI as a whole is static and does not change over the lifecycle of the application.

The EMV payment application using D-AND functionality is able to format and incorporate an Application Preferred Name of varying length into the core FCI. That requires to change the length parameters within the core FCI. Altering the core FCI, by incorporating the Application Preferred Name and changing the length parameters, results in a new FCI. The altered FCI is referred as the dynamic FCI. Since the dynamic FCI incorporates a value of the Application Preferred Name that is variable in content and in length, the length parameters of the dynamic FCI are unknown during the loading of the application to the integrated circuit card (ICC). The length parameters are therefore determined by the functionality associated with D-AND.

Regardless of where the functionality associated with D-AND resides on an ICC, i.e. where the method according to the invention is processed, this method for providing a dynamic mnemonic to a cardholder comprises the following steps as represented in FIG. 2.

Figure 4:
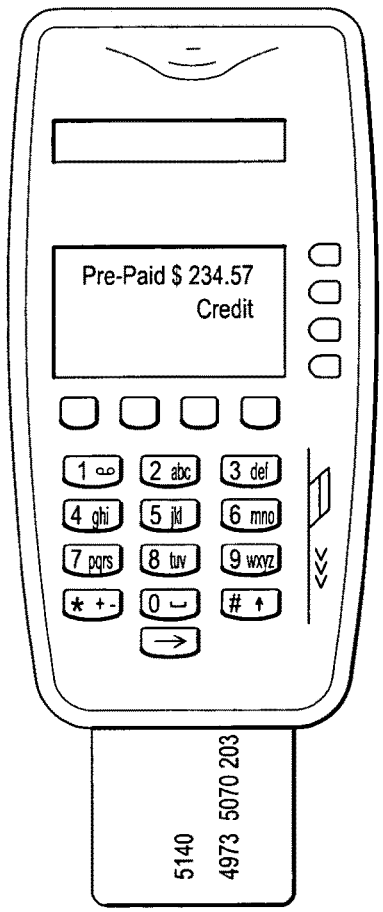
FIG. 4 and FIG. 5 schematically shows respectively a terminal before and after a transaction according to an embodiment of the present invention.

For example, as shown in FIG. 4, there are two EMV Payment Applications mutually supported by EMV payment terminal 210 and the ICC 200: one application which uses the D-AND functionality and another application with a static Application Preferred Name of say "Credit". The EMV payment terminal provides a display to the cardholder as that depicted in FIG. 4. The cardholder then indicates its desired selection by pressing one of the buttons associated with either of the mnemonics presented.

In the following description, the cardholder chooses the application which uses the D-AND functionality.

In a step 100 of FIG. 2, it is assumed that the EMV payment application has performed in a fashion that is in accordance with EMV standards. An EMV SELECT command ("C-APDU") has been received from the terminal 210 by the ICC 200 indicating that the EMV payment application using D-AND functionality is to be selected. The EMV process of Application Selection is defined fully within the EMV standards. Upon receipt of an EMV SELECT C-APDU indicating that the application utilizing D-AND functionality is to be selected, the EMV payment application 201 is programmed so as to execute the steps as depicted in FIG. 2.

After receipt of an EMV SELECT C-APDU indicating that the application utilizing D-AND functionality is to be selected, in a step 110, it is necessary to compose the Dynamic Application Preferred Name.

The Dynamic Application Preferred Name is comprised of two components: a Static Descriptor S and a Dynamic Balance DB.

The Static Descriptor component S is implementation-specific and is optionally defined by the issuer. The Static Descriptor component S is defined prior to the EMV Payment Application being loaded to the ICC. It is optional in that the Dynamic Application Preferred Name may be comprised solely of the Dynamic Balance. The order of S and DB, in comprising the Dynamic Application Preferred Name, is arbitrary.

In this embodiment, as also shown in FIG. 4, the Static Descriptor component S is for example defined as a static mnemonic "Pre-Paid_$". The Static Descriptor S does not change over the life of the card. As represented, S precedes DB.

It is well understood that DB can precede S, and that there may be more than one Static Descriptor S present within a Dynamic Application Preferred Name.

The Dynamic Application Preferred Name supplants the EMV-defined Application Preferred Name. As such, the Dynamic Application Preferred Name must adhere to the formatting restrictions imposed by EMV. The Dynamic Application Preferred Name is therefore currently limited to a length of sixteen characters, with each character being equivalent to one byte of data. The length of the Static Descriptor (L's, with the apostrophe symbol indicating a constant length) is ten, with eight characters for "Pre-Paid", one character for a blank space and one character for a dollar sign $.

The Dynamic Balance DB is transaction-specific. DB encompasses data that is expected to change over the course of the life of the EMV Payment Application. In this embodiment, and as also shown in FIG. 4, the Dynamic Balance DB reflects the Offline Balance, i.e., an amount, stored by the EMV Payment Application that is expected to change over the life of the card. DB changes for every transaction or periodically depending on specific card usage or the issuer's requirements to communicate to the cardholder.

It is well understood that the nature of the data represented within the DB is not a limited example. DB need not include balance information per se, and can include any information that the issuer of the card wishes to communicate to the cardholder during the EMV process of Application Selection.

The value of the Dynamic Balance, and the resulting length, is determined in step 111. Here, the current Offline Balance, maintained by the EMV payment application, is taken to be "23457" as shown in FIG. 4.

Once the Dynamic Balance component DB is determined, the Dynamic Balance DB is formatted in step 112. The process of formatting includes any manipulation of the dynamic component DB, such as the inclusion or removal of characters, decimals, commas, padding or blank spaces. The exact nature of the desired format is determined prior to the loading of the EMV Payment Application to the ICC 200. In the example of the FIG. 4, a decimal is added to provide two decimal spots. "23457" becomes "234.57".

After formatting, the Static Descriptor S and the Dynamic Balance DB are concatenated in step 113. The formatted dynamic descriptor DB is placed immediately following the Static Descriptor S. This yields "Pre-Paid_$234.57", which is sixteen characters in length.

The length of the Dynamic Application Preferred Name LA equals the sum of the length of the Static Descriptor L's plus the length of the Dynamic Balance (LDB): LA=L's+LDB.

The length of Dynamic Application Preferred Name LA must not be greater than 16: LA≤16.

Since L's is both known and static, LDB≤16−L's, which means that the maximum length of the Dynamic Balance component LDB is equal to 16 less the length of the Static Descriptor L's chosen by the Issuer. This is checked in step 114.

Here,
S="Pre-Paid_$", which in HEX is '5072652D506169642024'
L's=10
DB="234.57", which in HEX is '3233342E3537'
LDB=6
Therefore, $$LA=L's+LDB=10+6=16$$

Which is not greater than the maximum allowable 16 characters, or more specifically, $$10 \le 16-6$$

Since the length of this formatted Dynamic Application Preferred Name is not greater than 16, no further formatting is required.

When the formatted Dynamic Application Preferred Name is less than sixteen characters in length, padding may be added to achieve a desired length, but without exceeding 16 characters as specified by EMV for the Application Preferred Name.

If the length of the Dynamic Application Preferred Name exceeds the maximum allowed, that is, if LA was more than sixteen characters, then it would be desirable to implement further formatting so as to achieve an acceptable length. Indeed, proceeding with a formatted Dynamic Application Preferred Name that is greater than sixteen characters could cause the terminal 210 to either abort the transaction or improperly display the Dynamic Application Preferred Name to the cardholder.

Once the Dynamic Application Preferred Name has been composed, its value is placed in tag-length-value (TLV) format in step 115. The tag for the Dynamic Application Preferred Name is '9F12', which is defined within the EMV standards. In the example of the formatted Dynamic Application Preferred Name "Pre-Paid_$234.57", the length is sixteen characters long. In hexadecimal notation, the number sixteen is represented by '10'. Furthermore, in hexadecimal notation, "Pre-Paid_$234.57" is represented by '5072652D5061696420243233342E3537'. The TLV tag for the formatted Dynamic Application Preferred Name is therefore '9F12 10 5072652D5061696420243233342E3537'.

Once the TLV tag for the formatted Dynamic Application Preferred Name has been derived, it is ready to be incorporated into the core FCI, thereby creating the dynamic FCI.

The core FCI is then accessed and retrieved, which is accomplished in step 120.

Shown in FIG. 3 is the outline of a typical EMV FCI record. In this outline four data objects: tags '9F11', '5F2D', '87' and '50' constitute the FCI Proprietary Template. The FCI Proprietary Template, tag 'A5', along with tag '84' constitute the FCI Template. The FCI Template is represented by tag '6F'.

Within the FCI, each tag is followed by a length byte indicating the length of the data associated with that tag. Each length byte is in turn be followed by data of a length equal to that indicated by the length byte. Such a format is commonly referred to as tag-length-value (TLV) format. The length byte following tag '6F' and tag 'A5' indicate the length of the FCI Template and the length of the FCI Proprietary Template respectively. These two length values are assigned the variables nFT and nPT, respectively.

Using the outline of a typical FCI represented in FIG. 3 as a basis for the core FCI of the example of FIG. 4, a typical core FCI, with length and data values present, is as follows:

'6F 25

84 07 *A*0000000041010

A5 1*A*

50 0*A* 4*D*617374657243617264

87 01 81

5*F*2D 01 81

5*F*2D 04 656*E*6672

9*F*11 01 01'

Above, each tag is shown on a separate line. In actuality all data above is concatenated. It has been broken down for ease of understanding.

The length of the FCI Template, nFT, equals '25' and the length of the FCI Proprietary Template, nPT, equals '1A'. The length of the entire core FCI, nF, not shown, is '27'.

The core FCI, that is, the FCI defined and personalized for the application using the functionality associated with D-AND, is static. Thus, all values associated with the core FCI, including lengths, are known and remain constant over the life of the application. In the example cited above:
- the length of the FCI Record (nF)='27'=39 bytes;
- the length of the FCI Template (nFT)='25'=37 bytes;
- the length of the FCI Proprietary Template (nPT) ='1A'=26 bytes.

Once the TLV tag for the formatted Dynamic Application Preferred Name is incorporated into the core FCI, thereby creating the dynamic FCI, the value of all three of the above length bytes change.

Once the TLV tag for the formatted Dynamic Application Preferred Name has been derived and the core FCI has been retrieved, the dynamic FCI is created in step 130.

The functionality associated with D-AND has the EMV Payment Application incorporating the Dynamic Application Preferred Name in the core FCI by adding the TLV tag for the Dynamic Application Preferred Name to the FCI Proprietary Template.

In step 131, the TLV tag for the formatted Dynamic Application Preferred '9F12 10 5072652D5061696420243233342E3537' is added to the tags that comprise the FCI Proprietary Template in the core FCI.

In adding the TLV tag for the Dynamic Application Preferred Name to the FCI Proprietary Template, the length of the FCI Proprietary Template nPT obviously changes. Furthermore, because the FCI Proprietary Template is located in the FCI Template, a change in the length of the FCI Proprietary Template results in a change in the length of the FCI Template length, nFT.

Then in step 132, the functionality associated with D-AND changes the lengths of both the FCI Proprietary Template and the FCI Template to reflect the inclusion of the Dynamic Application Preferred Name. Length values from the core FCI, nPT and nFT, are changed to properly indicate the length values of the FCI Proprietary Template and the FCI Template, LPT and LFT respectively, in the dynamic FCI.

As seen before, the Dynamic Application Preferred Name, in TLV format, to be included in the FCI returned to the IFD is:

'9F12 10 5072652D5061696420243233342E3537'

The length of the Application Preferred Name in TLV format (LATLV) is always LATLV=LA+3. This allows for two bytes for the tag and one byte for the length.

Here, LA='10'=16 bytes in length.

Therefore, LATLV='13'=19 characters in length.

Step 132 determines all length values within the core FCI which are impacted by appending the Dynamic Application Preferred Name in TLV format. The impacted lengths are the length of the FCI Proprietary Template (LPT) and the length of the FCI template (LFT).

$$LPT = nPT + LATLV$$

$$LFT = nFT + LATLV$$

The functionality associated with D-AND also re-calculates the length of the entire dynamic FCI Record LF.

$$LF = nF + LATLV$$

LF is not included in the core FCI itself, but rather returned to the terminal 210 as part of an intermediate step in the EMV process of Application Selection necessary to explicitly identify the exact length of the FCI Record, in accordance to EMV standards.

In the example cited above, the core FCI is:

'6F 25

84 07 *A*0000000041010

A5 1*A*

50 0*A* 4*D*617374657243617264

87 01 81

5*F*2D 04 656*E*6672

9*F*11 01 01'

Where, $n$FT='25'=37 bytes $n$PT='1A'=26 bytes nF(not shown)='27'=39 bytes

As determined above, the Dynamic Application Preferred Name in TLV format to be appended is
'9F12 10 5072652D5061696420243233342E3537' of length '13'
Then the dynamic FCI is:

'6F 38

84 07 A0000000041010

A5 2D 50 0A 4D617374657243617264

87 01 81

5F2D 04 656E6672

9F11 01 01

9F12 10 5072652D5061696420243233342 E3537'

Where,

LFT=nFT+LATLV='25'+'13'='38'=56 bytes

LPT=nA+LATLV='1A'+'13'='2D'=45 bytes

Here LFT and LPT are exactly '13' (19) bytes larger than nFT and nA. 19 is the value of LATLV.

The length of the entire dynamic FCI to be returned to the terminal is:

LF=nF+LATLV='27'+'13'='3A'=58 bytes

Once the dynamic FCI has been created, in step 140, the EMV Payment Application returns the dynamic FCI in response to the EMV SELECT C-APDU.

The provisioning of the response (R-APDU) pursuant to the receipt of an EMV SELECT command (C-APDU) is in accordance with EMV standards and therefore falls outside the scope of functionality directly associated with D-AND.

Figure 5:
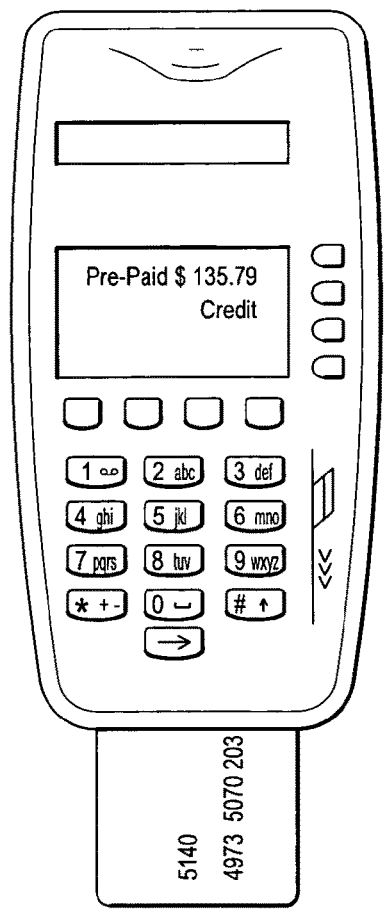

The dynamic FCI returned to the terminal 210 is followed immediately by status bytes SW1SW2='90 00', in accordance with EMV standards. If, for a subsequent transaction, the Dynamic Balance component changed, say to a value of $135.79, then the cardholder is presented with a display as depicted in FIG. 5. The dynamic balance displays an Offline Balance as part of the Application Preferred Name on the terminal 210. The terminal 210 displays the modified and updated mnemonic to the cardholder.

In both instances described by the images in FIGS. 4 and 5, the pre-paid mnemonic displayed is associated with the same EMV Payment Application on the same ICC. However the Application Preferred Name has been made dynamic through the implementation of functionality associated with D-AND.

It will be understood that the order of the execution of the steps associated with D-AND, is presented in a logical manner, and that the order can be altered. For example, the step 120, where the core FCI is accessed, can be executed prior to the step 110 in which the Dynamic Application Preferred Name is composed.

Furthermore, it is possible to mathematically determine the length of the dynamic FCI to be returned to the terminal prior to actually incorporating the Offline Balance into the Application Preferred Name.

As described above, this changing data can be managed online, i.e., at a remote host, or offline, i.e., on the card.

Thanks to this method, the displayed mnemonic allows an issuer to communicate varying information to the cardholder at the time of EMV application selection by incorporating an Application Preferred Name of varying length into the FCI and returning this variable-length FCI to the payment terminal 210.

The invention claimed is:

1. A method for operating an integrated circuit card to provide dynamic data associated with an EMV application during an EMV application selection process to a display of a payment terminal, wherein an application which is an EMV payment application is being selected to initiate and process a transaction, which modifies said dynamic data associated with said EMV application, wherein the method comprises:
   transferring the File Control Information (FCI) including an Application Preferred Name of a plurality of EMV applications available on the integrated circuit card to the payment terminal, the Application Preferred Name of at least one of said EMV applications includes a dynamic part associated with said dynamic data associated with said EMV application;
   receiving an EMV select command from the payment terminal specifying one of at least one EMV payment applications available on the integrated circuit card to be taken as said application selected to initiate and process the transaction;
   in response to receiving the EMV select command from the payment terminal, modifying said dynamic part of the Application Preferred Name of the FCI of the specified EMV application from transaction to transaction displayed on said display, said dynamic part being associated with said dynamic data of the EMV payment application, said dynamic part of the Application Preferred Name of the FCI of the specified EMV application being incorporated into the Application Preferred Name of the File Control Information of the specified EMV application of the integrated circuit card, by creating a dynamic File Control Information of variable length, determining the value and the length of said dynamic data, formatting said dynamic data, creating a tag-length-value (TLV) format from the formatted dynamic data, and incorporating the tag-length-value format into the Application Preferred Name of the File Control Information;
   wherein the modifying dynamically of at least a part of the Application Preferred Name of the FCI is handled by a second application, which is distinct from the selected application and which is an intermediate application receiving all commands sent from a terminal connected to the integrated circuit card and receiving all responses sent from the selected application.

2. The method according to claim 1, the method further comprising, if said data contains static data, concatenating said static data and said dynamic data.

3. The method according to claim 1 or 2, the method further comprising using a remote host as processing device.

4. The method according to claim 3, the method further comprising receiving the dynamic file control information in response to a command received by the processing device via the payment terminal.

5. A system for EMV payment application selection having the capability of presenting dynamic data to a user of the system on a display of a payment terminal, wherein an application which is an EMV payment application is being selected to initiate and process a transaction, which modifies said dynamic data associated with said EMV application, the system comprising:

a payment terminal operable:
to display on a display of the payment terminal, to a user during an EMV application selection process, application dynamic data of a plurality of EMV payment applications available on an integrated circuit card connected to the payment terminal
to receive the application dynamic data from an integrated circuit card, and the integrated circuit card comprising a second application distinct from said EMV payment application being selected to initiate and process a transaction and which is an intermediate application receiving all commands sent from a terminal connected to the integrated circuit card and receiving all responses sent from the selected application, said second application, in response to receiving an EMV select command from the payment terminal, the EMV select command selecting one of the plurality of EMV payment applications, to be taken as said application selected to initiate and process the transaction, operable to produce the dynamic data associated with a selected application by modifying the dynamic data associated with the selected application from transaction to transaction, the dynamic data being incorporated by the integrated circuit card into an Application Preferred Name of a File Control Information of the integrated circuit card, the Application Preferred Name of at least one of said EMV applications includes a dynamic part associated with said dynamic data associated with said EMV application, by the integrated circuit card creating a dynamic File Control Information of variable length, determining the value and the length of said dynamic data, formatting said dynamic data, creating a tag-length-value (TLV) format from the formatted dynamic data, and incorporating the tag-length-value format into the Application Preferred Name of the File Control Information.

6. The system to claim 5, further comprising, if said data contains static data, concatenating said static data and said dynamic data.

7. The system to claim 5 or 6, wherein said data is an Application Preferred Name.

8. The method according to claim 1, wherein the intermediate application is a MULTOS Shell application which interfaces with the first application.

* * * * *